US012786419B2

(12) United States Patent
Pang et al.

(10) Patent No.: US 12,786,419 B2
(45) Date of Patent: Nov. 3, 2026

(54) OUTLIER GROUPING BASED POINT CLOUD COMPRESSION

(71) Applicant: InterDigital Patent Holdings, Inc., Wilmington, DE (US)

(72) Inventors: Jiahao Pang, New York, NY (US); Dong Tian, Wilmington, DE (US); Maurice Quach, Gif-sur-Yvette (FR); Giuseppe Valenzise, Gif-sur-Yvette (FR); Frederic Dufaux, Gif-sur-Yvette (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 239 days.

(21) Appl. No.: 18/706,253

(22) PCT Filed: Oct. 18, 2022

(86) PCT No.: PCT/US2022/046955
§ 371 (c)(1),
(2) Date: Apr. 30, 2024

(87) PCT Pub. No.: WO2023/091260
PCT Pub. Date: May 25, 2023

(65) Prior Publication Data

US 2026/0136018 A1 May 14, 2026

Related U.S. Application Data

(60) Provisional application No. 63/281,803, filed on Nov. 22, 2021.

(51) Int. Cl.
*H04N 19/157* (2014.01)
*H04N 19/132* (2014.01)
(Continued)

(52) U.S. Cl.
CPC ......... *H04N 19/157* (2014.11); *H04N 19/132* (2014.11); *H04N 19/136* (2014.11); *H04N 19/46* (2014.11)

(58) Field of Classification Search
CPC .. H04N 19/157; H04N 19/132; H04N 19/136; H04N 19/46; H04N 19/597;
(Continued)

(56) References Cited

U.S. PATENT DOCUMENTS

2020/0334866 A1* 10/2020 Lasserre ................ H04N 19/20
2021/0329055 A1* 10/2021 Hur ........................ H04L 65/762
(Continued)

FOREIGN PATENT DOCUMENTS

WO WO2022232547 A1 11/2022

OTHER PUBLICATIONS

Ainala, “An Improved Enhancement Layer for Octree Base Point Cloud Compression With Plane Projection Approximation”, Proceeding of SPIE; ISSN 0277-786X vol. 10524, SPIE, US, vol. 9971, Sep. 27, 2016, pp. 99710R-1-99710R-9.
(Continued)

*Primary Examiner* — Jared Walker
(74) *Attorney, Agent, or Firm* — Xiaoan Lu

(57) ABSTRACT

A Folding-based point cloud compression system or a regular convolution-based point cloud compression system may lack the ability to precisely manage compression of all points in a point cloud frame. For example, they may provide good predicted positions for some points but not necessarily an exact reconstruction, especially after being quantized. Consequently, some outlier points may fall outside of the surface constructed by a Folding-based method or a convolution-based method. In one implementation, we propose to compress two types of outlier points separate from “inlier” points. First, we detect model outlier points,
(Continued)

which are points that do not have good prediction from a model. Then quantization outlier point detection is conducted to further separate those points that are sensitive to the compression (e.g., quantization) in the model transformed domain. Such outlier processing would provide efficient coding of most points (inlier points) and special handling on the outlier points.

18 Claims, 16 Drawing Sheets

(51) Int. Cl.
*H04N 19/136* (2014.01)
*H04N 19/46* (2014.01)

(58) Field of Classification Search
CPC ........ H04N 19/70; H04N 19/96; H04N 19/50; H04N 19/119; H04N 19/54; H04N 21/816
See application file for complete search history.

(56) References Cited

U.S. PATENT DOCUMENTS

2021/0329270 A1* 10/2021 Yea ...................... H04N 19/172
2021/0329298 A1* 10/2021 Ramasubramonian ...................... H04N 19/174
2021/0377566 A1* 12/2021 Iguchi .................. H04N 19/597

OTHER PUBLICATIONS

Tulsiani et al., "Learning Shape Abstractions by Assembling Volumetric Primitives", Institute of Electrical and Electronics Engineering (IEEE), 2017 IEEE Conference on Computer Vision and Pattern Recognition (CVPR), Nov. 9, 2017, Honolulu, Hawaii USA, 9 pages.
MEPG 3DG, "G-PCC codec description v9", ISO/IEC JTC1/SC29/WG7, N0011, 2020.
Yang, et al., "Foldingnet: Point cloud auto-encoder via deep grid deformation", Proceedings of the IEEE Conference on Computer Vision and Pattern Recognition 2018, pp. 206-215.
Quach et al., "Improved Deep Point Cloud Geometry Compression", Institute of Electrical and Electronics Engineers (IEEE), 2020 IEEE 22nd International Workshop on Multimedia Signal Processing (MMSP), Tampere, Finland, Sep. 21, 2020, 6 pages.
Li et al., "Primitive fitting using deep boundary aware geometric segmentation", arXiv preprint arXiv:1810.01604 (2018).
Huang et al., "DeepPrimitive: Image decomposition by layered primitive detection", Computational Visual Media 4.4 (2018): 385-397.
Eldar et al., "The Farthest point strategy for progressive image sampling", IEEE Trans. on Image Processing, vol. 6, No. 9, pp. 1305-1315, 1997.
Zou et al., "3D-PRNN: Generating Shape Primitives with Recurrent Neural Networks", Institute of Electrical and Electronics Engineering (IEEE), 2017 IEEE International Conference on Computer Vision (ICCV), Oct. 22, 2017, Venice, Italy, 10 pages.
Pang, et al., "TearingNet: Point Cloud Autoencoder to Learn Topology-Friendly Representations", 2021 IEEE/CVF Conference on Computer Vision and Pattern Recognition (CVPR), Apr. 1, 2021, pp. 7449-7458.
Li et al., "Grass: Generative recursive autoencoders for shape structures", ACM Transactions on Graphics (TOG), vol. 36, Issue 4, Article No. 52, Jul. 20, 2017, 14 pages.
Chen et al., "Bsp-net: Generating compact meshes via binary space partitioning", Proceedings of the IEEE/CVF Conference on Computer Vision and Pattern Recognition, arXiv:1911.06971v6 [cs.CV] Dec. 7, 2020, 10 pages.
Chen, et al., "Fast resampling of three-dimensional point clouds via graphs", IEEE Transactions on Signal Processing 66.3 (2017): 666-681.
Pang et al., "Grasp-Net: Geometric Residual Analysis and Synthesis for Point Cloud Compression", arXiv:2209.04401v1 [eess.IV], Cornell University Library, 201 Olin Library University Itahaca, NY 14853, Sep. 9, 2022.
Meagher, "Geometric modeling using octree encoding", Computer graphics and image processing 19.2 (1982):129-147.
Ballé, et al., "Variational image compression with a scale hyperprior", In ICLR 2018.
Qi, et al., "PointNet: Deep learning on point sets for 3D classification and segmentation", in proc. IEEE Conference on Computer Vision and Pattern Recognition, pp. 652-660, 2017.
Nguyen et al., "3D Point Cloud Segmentation: A Survey", 6th IEEE Conference on Robotics Automation and Mechatronics (RAM), IEEE, Nov. 12, 2013, 16 pages.
Huang et al., "OctSqueeze: Octree-Structured Entropy Model for LiDAR Compression", Proceedings of the IEEE/CVF Conference on Computer Vision and Pattern Recognition, 2020, pp. 1313-1323.
Li et al., "Supervised Fitting of Geometric Primitives to 3D Point Clouds", Institute of Electrical and Electronics Engineers (IEEE), 2019 IEEE/CVF Conference on Computer Vision and Pattern Recognition (CVPR), Long Beach, California USA, Jun. 15, 2019, 9 pages.

* cited by examiner

```
Struct residual_point {
  int num;
  for ( i = 0; i < num; i++ ) {
    res_x[i];
    res_y[i];
    res_z[i];
  }
}
```

FIG. 12

OUTLIER GROUPING BASED POINT CLOUD COMPRESSION

CROSS REFERENCE TO RELATED APPLICATIONS

This application is a U.S. National Stage Application under 35 U.S.C. 371 of International Patent Application No. PCT/US2022/046955, filed Oct. 18, 2022, which is incorporated herein by reference in its entirety.

This application claims the benefit of U.S. Patent Application No. 63/281,803 filed Nov. 22, 2021, which is incorporated herein by reference in its entirety.

TECHNICAL FIELD

The present embodiments generally relate to a method and an apparatus for point cloud compression and processing.

BACKGROUND

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple ipad Pro 2020 and Intel RealSense LiDAR camera L515. With advances in sensing technologies, 3D point cloud data becomes more practical than ever and is expected to be an ultimate enabler in the applications discussed herein.

SUMMARY

According to an embodiment, a method of decoding point cloud data is provided, comprising: obtaining a first set of data, representative of smooth part of said point cloud data; decoding said first set of data by a first type of method; obtaining a second set of data, representative of remaining part of said point cloud data; decoding said second set of data by at least a second type of method, wherein said at least a second type of method is different than said first type of method; and concatenating said first and second sets of data.

According to another embodiment, a method of encoding point cloud data is provided, comprising: obtaining a first set of data of a point cloud, representative of smooth part of said point cloud; encoding said first set of data by a first type of method; obtaining a second set of data of said point cloud, representative of remaining part of said point cloud; encoding said second set of data by at least a second type of method, wherein said at least a second type of method is different than said first type of method.

According to another embodiment, an apparatus for decoding point cloud data is provided, comprising one or more processors, wherein said one or more processors are configured to obtain a first set of data, representative of smooth part of said point cloud data; decode said first set of data by a first type of method; obtain a second set of data, representative of remaining part of said point cloud data; decode said second set of data by at least a second type of method, wherein said at least a second type of method is different than said first type of method; and concatenate said first and second sets of data. The apparatus may further include at least one memory coupled to said more or more processors.

According to another embodiment, an apparatus for encoding point cloud data is provided, comprising one or more processors, wherein said one or more processors are configured to obtain a first set of data of a point cloud, representative of smooth part of said point cloud; encode said first set of data by a first type of method; obtain a second set of data of said point cloud, representative of remaining part of said point cloud; encode said second set of data by at least a second type of method, wherein said at least a second type of method is different than said first type of method. The apparatus may further include at least one memory coupled to said more or more processors.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding point cloud data according to the methods described above.

One or more embodiments also provide a computer readable storage medium having stored thereon video data generated according to the methods described above. One or more embodiments also provide a method and apparatus for transmitting or receiving the video data generated according to the methods described above.

BRIEF DESCRIPTION OF THE DRAWINGS

FIG. 12 illustrates an example of data structure to store residual vectors, according to an embodiment.

DETAILED DESCRIPTION

Figure 1:
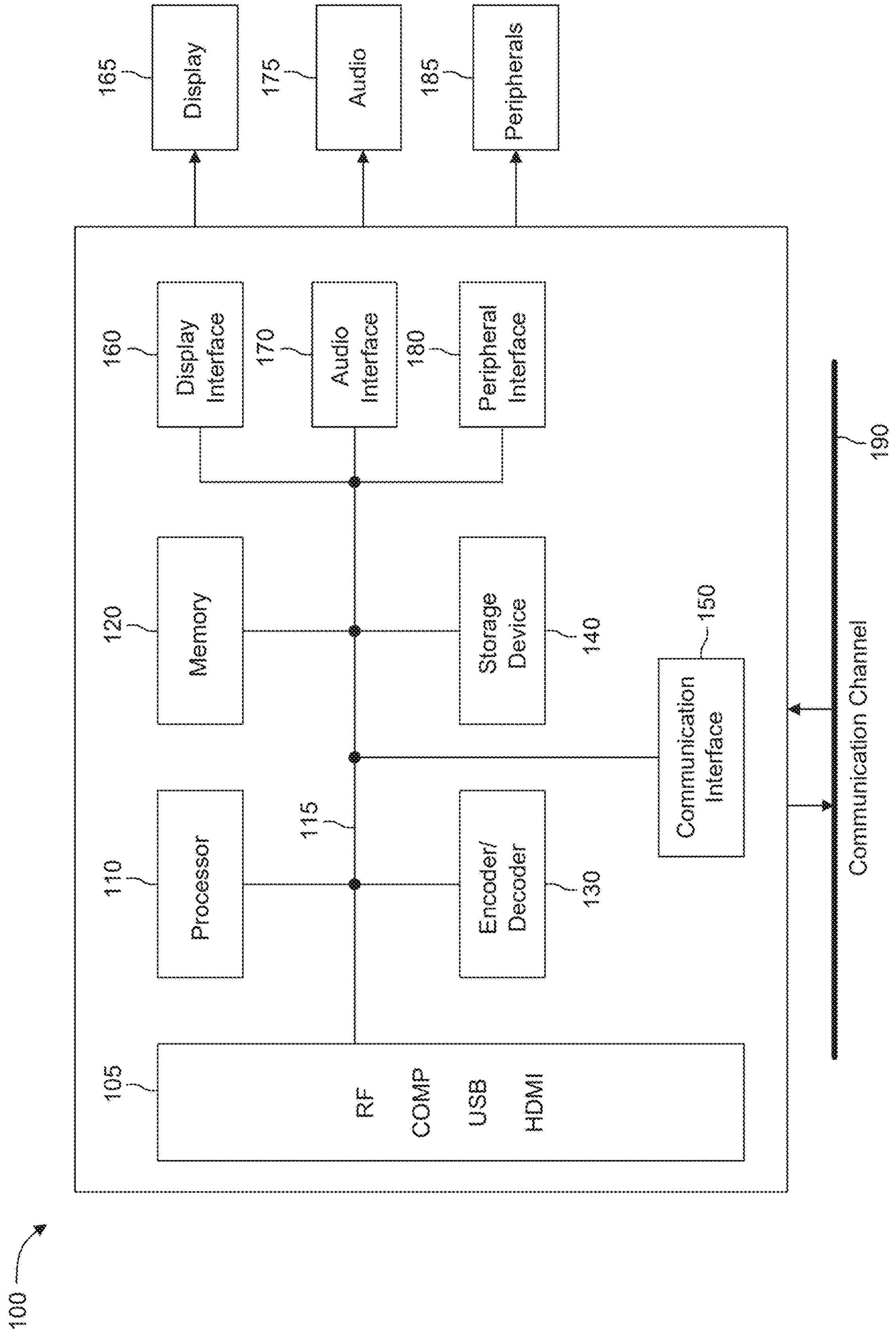
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, VVC, MPEG-I, or JPEG Pleno.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802. 11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

It is contemplated that point cloud data may consume a large portion of network traffic, e.g., among connected cars over 5G network, and immersive communications (VR/AR). Efficient representation formats are necessary for point cloud understanding and communication. In particular, raw point cloud data need to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds are foreseen by many as the future of 2D flat video. For VR and immersive worlds, a viewer is immersed in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. The point cloud for use in VR may be static or dynamic and are typically of average size, for example, no more than millions of points at a time.

Point clouds may also be used for various purposes such as culture heritage/buildings in which objects like statues or buildings are scanned in 3D in order to share the spatial configuration of the object without sending or visiting the object. Also, point clouds may also be used to ensure preservation of the knowledge of the object in case the object may be destroyed, for instance, a temple by an earthquake. Such point clouds are typically static, colored, and huge.

Another use case is in topography and cartography using 3D representations, maps are not limited to the plane and may include the relief. Google Maps is a good example of 3D maps but uses meshes instead of point clouds. Nevertheless, point clouds may be a suitable data format for 3D maps and such point clouds are typically static, colored, and huge.

World modeling and sensing via point clouds could be a useful technology to allow machines to gain knowledge about the 3D world around them for the applications discussed herein.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

In order to perform processing or inference on a point cloud, efficient storage methodologies are needed. To store and process an input point cloud with affordable computational cost, one solution is to down-sample the point cloud first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down-sampled) into a bitstream through entropy coding techniques for lossless compression. Better entropy models result in a smaller bitstream and hence more efficient compression. Additionally, the entropy models can also be paired with downstream tasks which allow the entropy encoder to maintain the task-specific information while compressing.

In addition to lossless coding, many scenarios seek lossy coding for significantly improved compression ratio while maintaining the induced distortion under certain quality levels.

Compression Tools for Smooth Point Clouds

Folding-based point cloud generators/decoders are one of the methods that explicitly utilize a hypothesis that the point clouds to be processed are sampled from 2D surfaces/manifolds in 3D space. Hence, a 2D primitive is provided as input to the Folding-based generator/decoder. To facilitate the implementation, the 2D primitive is sampled as a set of 2D grid.

Provided the hypothesis, a compression technique based on Folding may be efficient to code large smooth area in a point cloud frame. This may be also the case when applying regular deconvolutions for compression of voxelized point clouds.

Predictive Coding for Video Compression

In image/video coding, predictive-based techniques are widely utilized to favor the coding efficiency. In particular, a predictive coding may be performed based on a previously coded block from the current frame, that is known as Intra prediction. In another design, a predictor may be based on an image block from a previously coded image frame, which is known as Inter prediction.

Outlier Coding for Neural Network Model Compression

Outlier detection and compression was utilized in neural network model compression. During compression of neural network parameters, outlier parameters are detected and coded separately from inlier parameters due to their different distribution characteristics. Differently, in this document, we propose to perform outlier detection for learning-based point cloud compression, where the inlier points and the outlier points of an input 3D point cloud are encoded/decoded separately.

Outlier Point Types

There are two major types of coding strategies for learning-based point cloud compression. Convolution-based methods are often used to compress voxelized point clouds. In this type of coding strategy, the voxelized point clouds are defined on regular 3D grid positions, hence 3D convolutional layers can be applied as the basic backbone to process them. The 3D convolutional layers being used can either be regular 3D convolution/deconvolution or 3D sparse convolution/deconvolution.

Another type of coding strategy is the Folding-based methods, which can be used to compress native point clouds. That is, Folding-based approaches could compress point clouds directly without having a point cloud being voxelized first. With Folding-based methods, we would utilize multi-layer perceptron (MLP) layers instead of convolutional neural network (CNN) layers. Folding is also known as a particular point-based approach that directly operates over 3D points. This can be advantageous if the point cloud is very sparse and thus it can be expensive in terms of computing and memory usage if the point cloud is to be voxelized.

Figure 2:
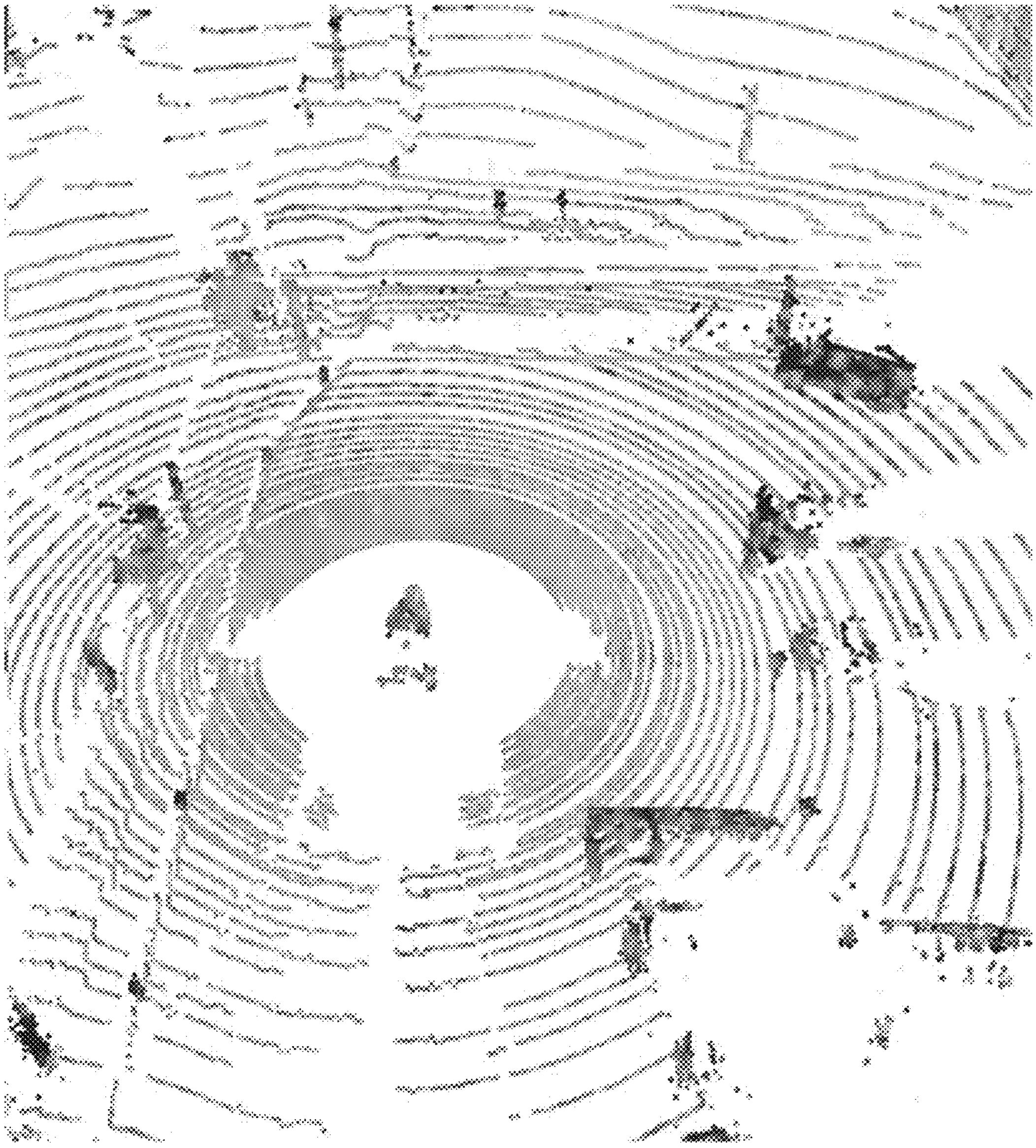
FIG. 2 illustrates an example of model outliers.

A Folding-based point cloud compression method takes an assumption that a point cloud represents a 2D manifold or surface in 3D space. For ease of notation, we refer to the 2D manifold or surface in 3D space as a 3D surface. Typically, the 3D surface is smooth. Similarly, a convolution-based point cloud processing method also favors large smooth 3D surfaces/shapes. As a result, such model-based methods may not compress all points in a point cloud efficiently, and those failed points are referred to as a first type of outlier points—hereinafter referenced as model outlier points. For example, isolated points that stay away from the 3D surfaces/shapes may be classified as the first type of outliers. Another example of model outlier points may be from an area with complex topologies that are hard to be represented by a model. In FIG. 2, the black points are examples of model outlier points, that are likely to appear in a few clusters.

Moreover, Folding-based approaches typically first define a "continuous" 2D region that can be embedded/folded in the 3D space, hereinafter referenced as a surface S. Therefore, a point on this surface can be represented/parameterized by a 2D coordinate (u, v). At the meanwhile, this (u, v) coordinate corresponds to one point (x, y, z) in the 3D space. Then an original 3D point with (x, y, z) coordinate can be projected as a 2D point in surface S, i.e., represented by a (u, v) coordinate. Hence the coding of original points (x, y, z) becomes the coding of 2D points (u, v). To be friendly for an entropy coding, the set of (u, v) coordinates may be quantized before being compressed into a bitstream.

Figure 3:
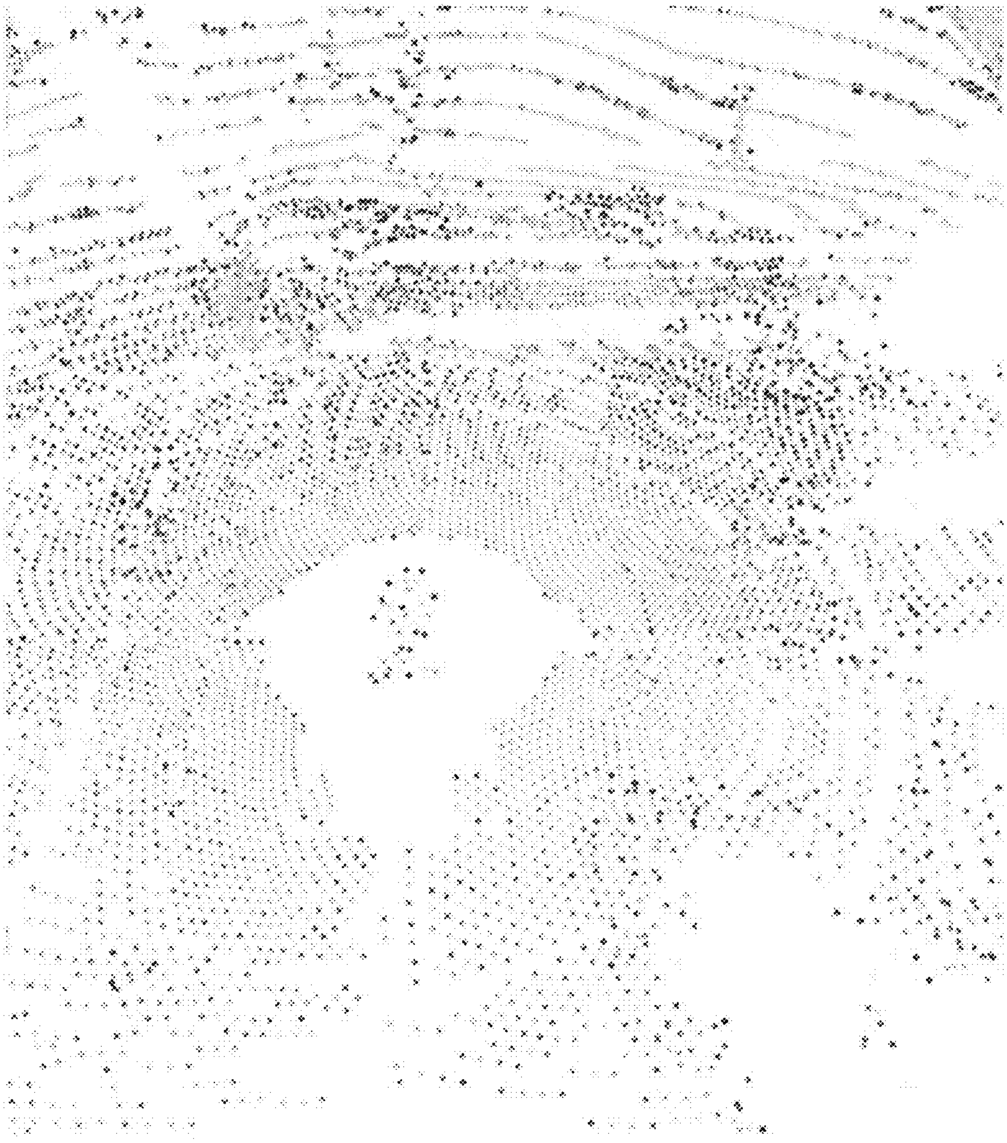
FIG. 3 illustrates an example of quantization outliers.

However, it is noticed that a uniform quantization on (u, v) coordinate may lead to different distortion levels in the original (x, y, z) domain. It partially depends on the local curvatures of a point in surface S. That is, for a point from a flat area, it is less sensitive to quantization errors; while for a point from an area with intricate structures, e.g., an edge or a corner, etc., larger distortion in (x, y, z) domain may be introduced. A too large distortion may be unacceptable, and then the corresponding 3D point is classified into the second type of outliers—hereinafter referenced as quantization outlier points. This type of outlier points is specifically considered for Folding-based methods. In FIG. 3, the black points are examples of quantization outlier points that are more spread over the point cloud (comparing to model outlier points).

We propose to classify two types of outlier points, and the remaining points are referenced as inlier points. Model outlier points fail to be represented by the Folding- or convolution-based model description. Quantization outlier points fail to be precisely reconstructed due to quantization in the domain for entropy coding. By separately handling the quantization outlier points, the Folding-based point cloud compression system can be improved.

In the end, inlier points will be coded using prediction based on the models. Outlier points will be coded using a different approach to be presented hereinafter. According to which type of outliers are used/encoded, and how the inliers/outliers are encoded, extra coding mode will also be encoded, such as in the form of side information (SI), together with the bitstreams of the inlier and the outliers (e.g., FIG. 4). In one embodiment, the coding mode indicates which type of points are coded in the associated bitstream, that can be inlier points or outlier points. In another embodiment, it indicates which methods are used to encode the outlier points.

Model Outlier Detection

Figure 4:
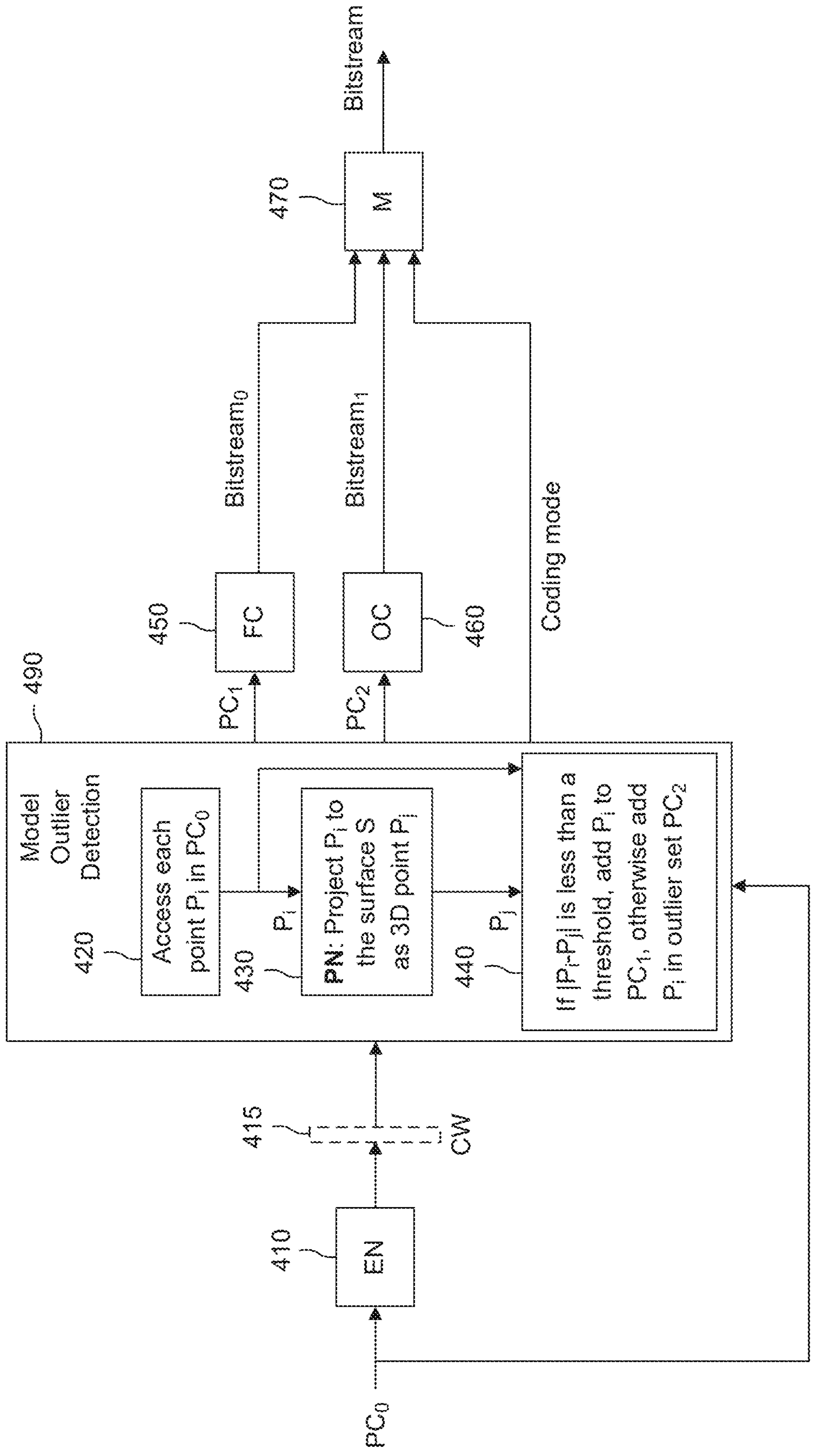
FIG. 4 illustrates a point cloud compression system with model outlier detection, according to an embodiment.

A point cloud compression system with model outlier point detection is depicted in FIG. 4, according to an embodiment. $PC_0$ represents an input point cloud to a compression system, which is coded (410) into a codeword CW (415). The codeword describes the input point cloud in a latent space, representing a surface S, for example. To simplify the description, we let the CW represent a reconstructed codeword if the codeword undergoes a lossy compression.

The (reconstructed) codeword CW is sent to a "model outlier detection" module (490) to group points into two sets, $PC_1$ and $PC_2$, respectively. $PC_1$ represents the set of inlier points that are able to be precisely represented by the surface S (usually the smooth part of the point cloud), and $PC_2$ represents an outlier point set. The "model outlier detection" module performs the following steps for each input point.

In Step 420, it takes a 3D point $P_i$ from the input point cloud $PC_0$. In Step 430, the PN module projects $P_i$ to a 3D point $P_j$ within the surface S defined by codeword CW. In one embodiment, the PN module is composed of a neural network that approximates a family of continuous surfaces. Details of the PN module design will be presented hereinafter. In Step 440, if the error between $P_i$ and $P_j$ is found smaller than a threshold, point $P_i$ is inserted to the inlier point set $PC_1$. Otherwise, point $P_i$ is inserted into the outlier point set $PC_2$.

Figure 5:
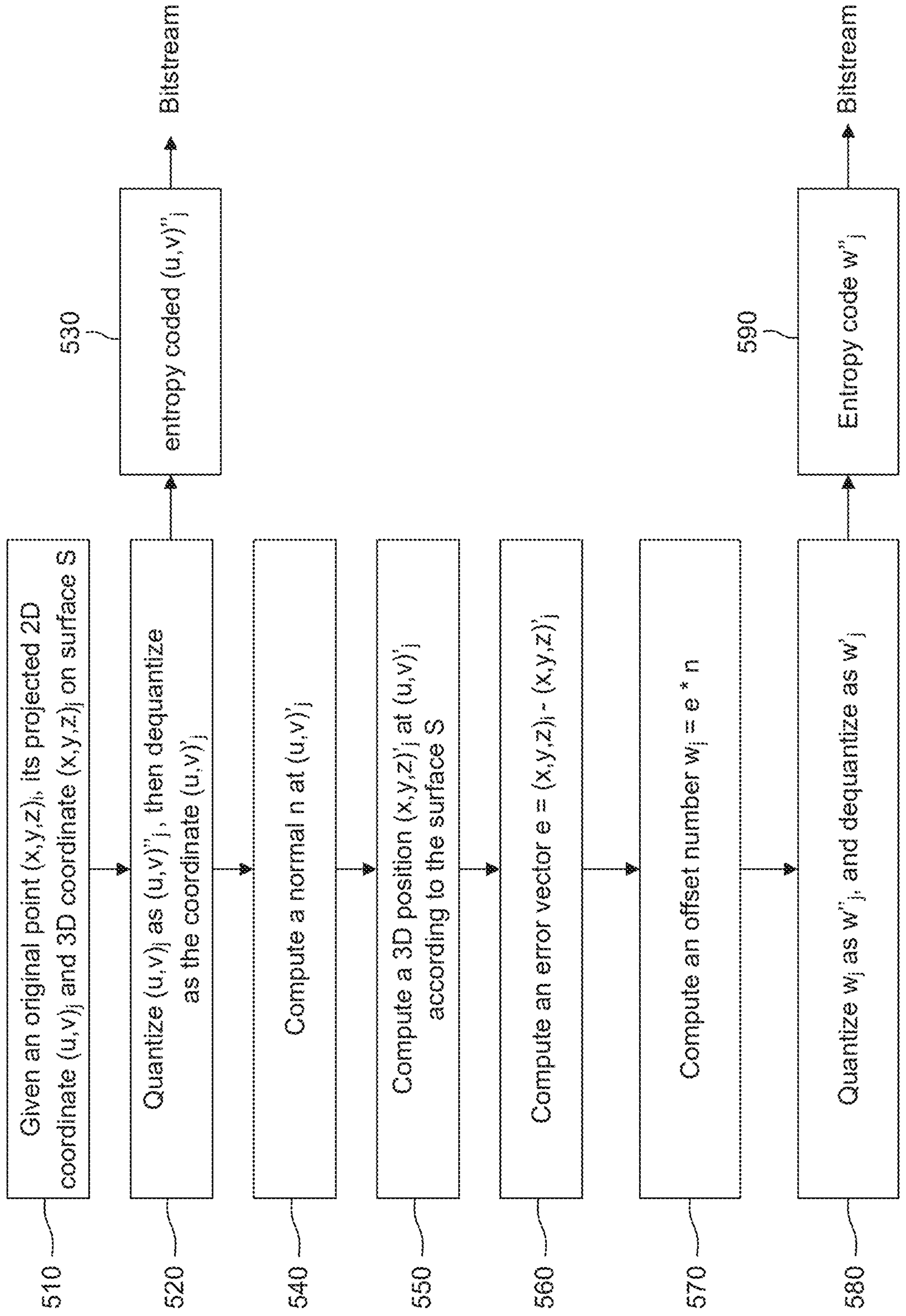
FIG. 5 illustrates a method of coding inlier point set, according to an embodiment.

Coding of inlier points: The coding of inlier points is performed by the FC module (450). For example, when the Folding-based method is used, $P_j$ is compressed using its 2D coordinate $(u, v)_j$ in the surface S (510), as shown in FIG. 5. In one embodiment, $P_j$ is to be compressed to represent $P_i$, because $P_j$ is in the surface S, and easier to be coded. Typically, $(u, v)_j$, representing $P_j$ on the surface S, is quantized (520) as $(u, v)''_j$ before being entropy coded (530). Let $(u, v)'_j$ represent the dequantized 2D coordinate (520). Note that a quantization error may be introduced. For a potential refinement of reconstruction, an unit normal vector n of surface S is computed (540) at location $(u, v)'_j$. A 3D position $(x, y, z)'_j$ is also computed (550) based on the 2D position $(u, v)'_j$ in surface S. An error vector is then computed (560) by $e=(x, y, z)_i-(x, y, z)'_j$, where $(x, y, z)_i$ and $(x, y, z)'_j$ are the 3D position of $P_i$ and a reconstructed $P_j$, respectively. Then the error vector e is projected along the normal direction n, to obtain (570) an offset number: $w_j=e*n$, where * is an inner product between the two 3D vectors. The offset number $w_j$ is quantized (580) as $w''_j$ and coded (590) into a bitstream. A dequantized offset is $w'_j$ (580). At decoder side, $P_i$ is reconstructed based on decoded $(u, v)'_j$ and decoded $w'_j$.

Coding of outlier points: Points in $PC_2$ will be compressed using the OC module (460) in FIG. 4, a different compression method than FC (450), since outlier points in $PC_2$ exhibit different characteristics than inlier points in $PC_1$. In one embodiment, points in $PC_2$ are encoded using an octree-based coding method. In another embodiment, their 3D coordinates could just be coded directly if the $PC_2$ set has just a small number of points. We will also describe a predictive coding approach hereinafter.

The $Bitstream_0$ (for $PC_1$) output by FC (450), and $Bitstream_1$ (for $PC_2$) output by OC (460), alongside with the coding mode information, can be merged as one bitstream using the module M (470). The merged bitstream can then be sent to the decoder.

PN Projection Module

Figure 6:
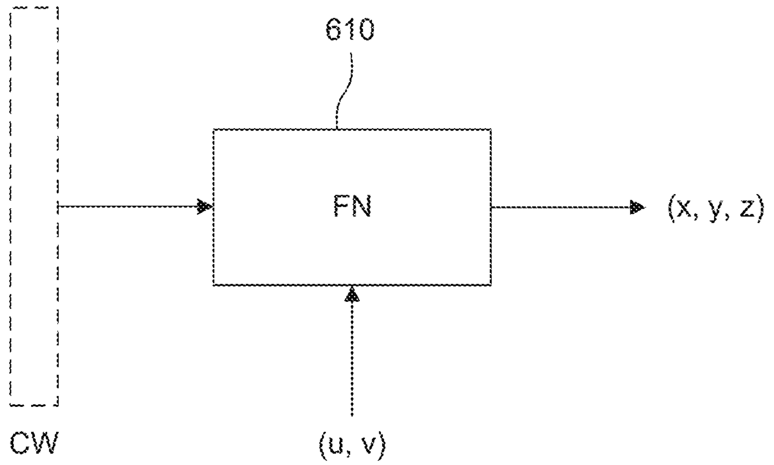
FIG. 6 illustrates surface parameterization-using a network to approximate a surface.

The PN projection module (430) is designed according to how the surface S is represented in the framework. In one embodiment, the surface S is parameterized by 2D coordinates (u, v) using a surface function approximated by a Folding function—FN. That is, for a given (u, v) 2D position, FN function (610) would generate a 3D position (x, y, z) in the surface S: (x, y, z)=FN(u, v), as shown in FIG. 6. FN function could be generalized to further take a codeword CW as input in addition to (u, v), and thus FN function could model a family of 2D surfaces instead of a single 2D surface, i.e., (x, y, z)=FN (u, v; CW).

Figure 7:
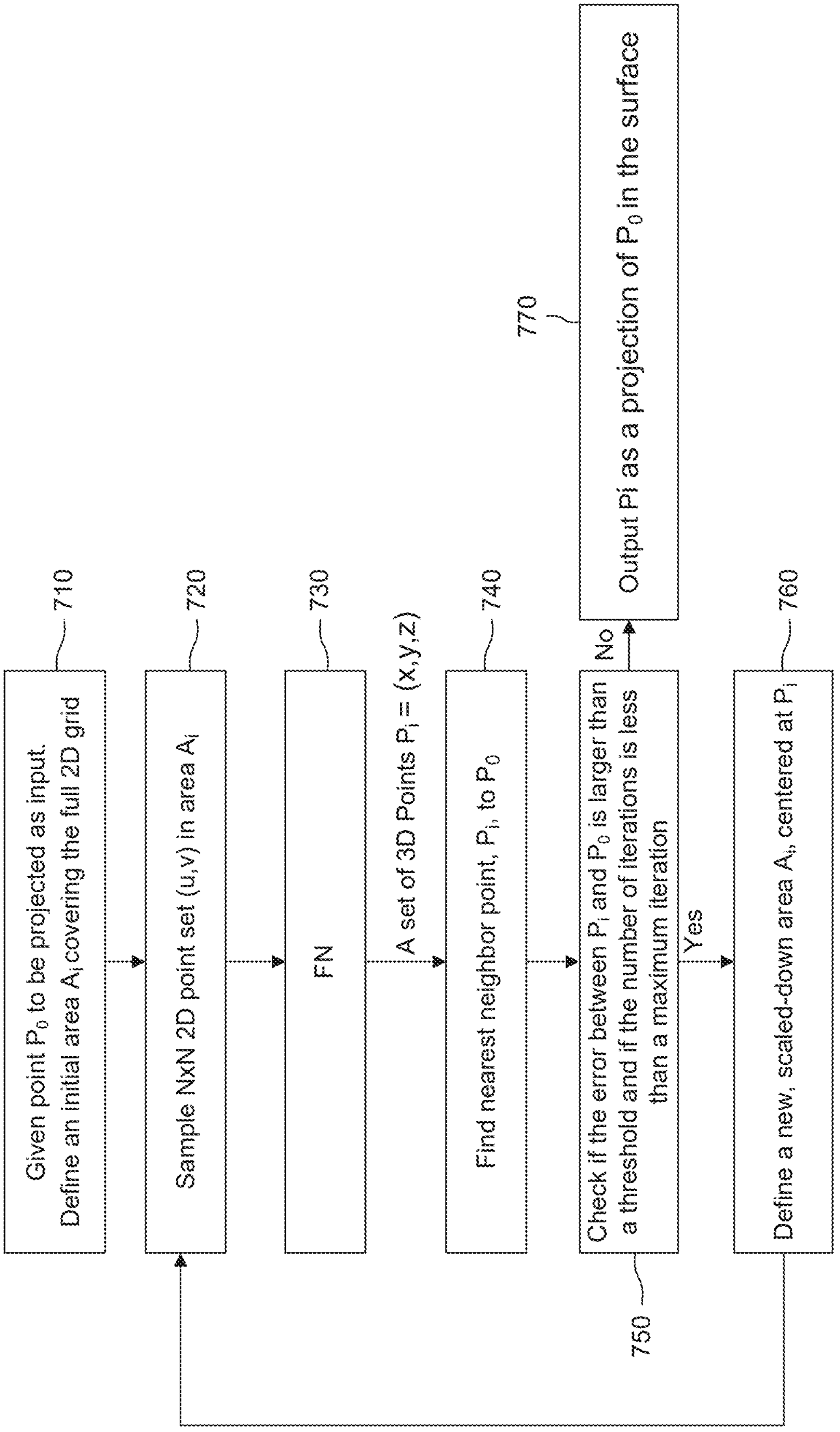
FIG. 7 illustrates a projection module with an iterative method, according to an embodiment.

Providing such a FN function, a projection function PN is now designed in an iterative manner, according to one embodiment as illustrated in FIG. 7. We let $P_0$ to be a 3D point from input point cloud $PC_0$ to be projected (710). We also assume that the FN function, a Folding-based neural network module, has already been trained. The FN has an initial 2D area with a predefined range for u and v, for example, a square region with coordinates between −1 and 1.

First, we sample (720) N×N points over the full 2D area. Though not necessarily, we let the samples to be equally spaced. The number of N should not be selected too large or too small. If too large, it leads to waste of too many trials in each iteration. If too small, more sequential iterations will be required. In one embodiment, we let N=4, i.e., 16 trials for each iteration. The sampled 2D points are then mapped to 3D points via the FN function (730). A nearest neighboring point $P_i$ is identified (740) from the mapped 3D points to point $P_0$.

Finally, we check (750) the error between $P_i$ and $P_0$. If the error is smaller than an accuracy threshold, we output (770) $P_i$ as the projection of $P_0$ in the surface S. The associated $(u, v)_i$ coordinate with $P_i$ is output for compression. If the error is larger than the threshold, we define (760) a new local area centered at $P_i$ and the size is reduced, for example, by 1/N×1/N, from previous iteration. A new iteration is then started until the projected point is sufficiently close to the input point or a maximum iteration number is reached.

Non-Iterative PN Projection Module

Figure 8:
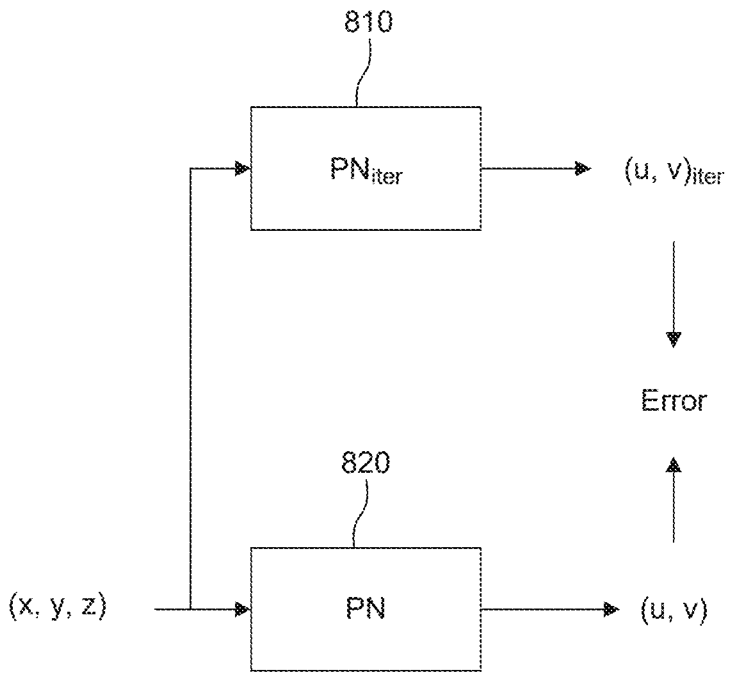
FIG. 8 illustrates a method of training a non-iterative projection network, according to an embodiment.

The PN projection module proposed above may involve several iterations to achieve an accurate projection. In order to control the computation complexity, we may want to avoid the iterative procedure. In one embodiment, we can train a neural network module that do the projection in a single pass, as shown in FIG. 8.

Let PN (820) be the non-iterative network to be trained, that is based on multiplayer perceptron (MLP) layer in one implementation. The PN function is basically an approximation of the inverse of the FN function. The PN function takes a 3D position as input and outputs a 2D position. The idea is to use the iterative PN function (810, $PN_{iter}$) to supervise the training of the non-iterative PN function. That is, we let the iterative function $PN_{iter}$ take the same input 3D position, $PN_{iter}$ will output a 2D position, which is used to compute an error with the output from PN function. The error will be back propagated to update the network parameters of PN function. Note that PN and $PN_{iter}$ both take the codeword CW as their additional input.

Quantization Outlier Detection

In the following, we use the Folding approach as an example for model based compression, where a 2D coordinate (u, v) is to be coded instead of the 3D points in the original 3D domain to favor coding efficiency. We assume that the points concerned here have passed the model outlier test. That is, they are all able to be "accurately" predicted via the model-Folding model in this example.

When a typical uniform quantization is applied in the (u, v) domain for an entropy coding purpose (as shown in FIG. 5), a quantization error is introduced for all (u, v) points. During decoding, the dequantized (u, v)' points are used to reconstruct their 3D positions according to the Folding function via an FN network. Since the (u, v) points are along the 2D surface, and a minor quantization error along the surface may result in a large error in 3D space if the point locates in some areas, e.g., with intricate structures.

Figure 9:
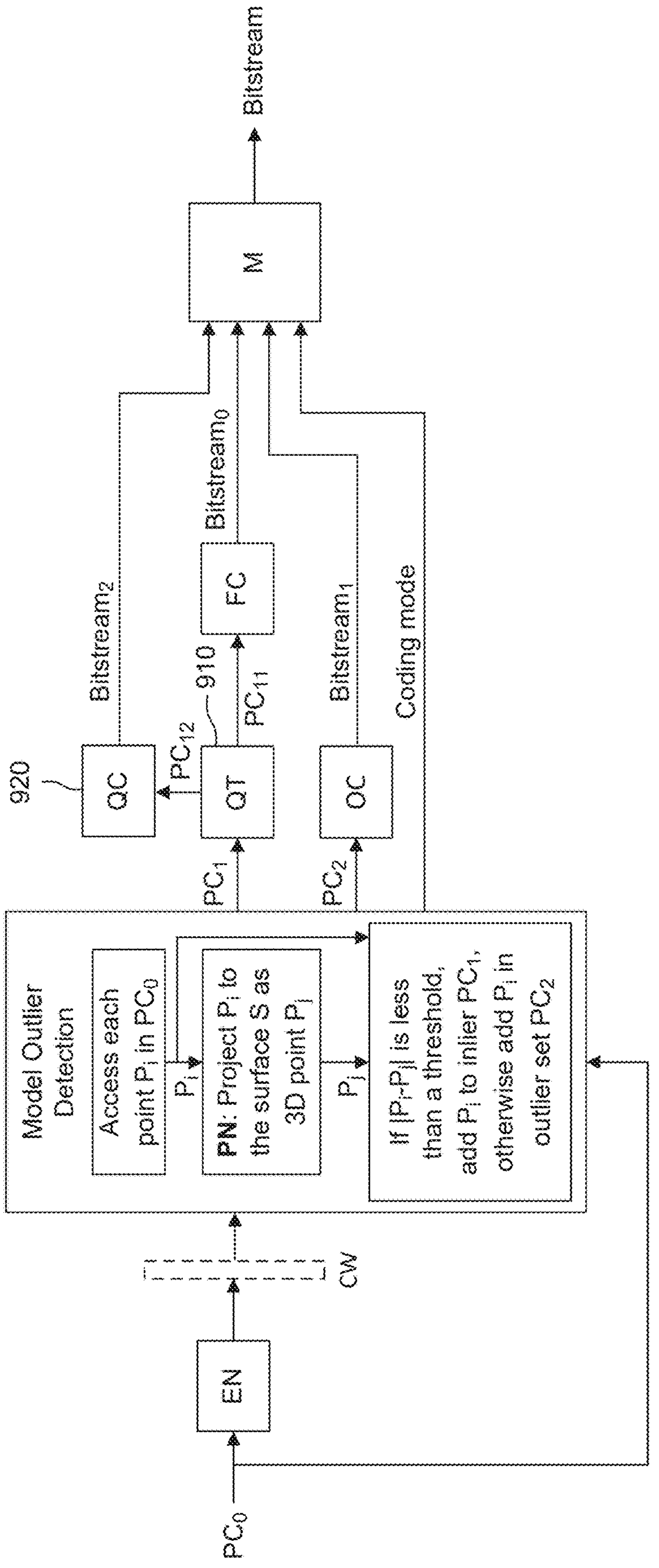
FIG. 9 illustrates an encoding system with quantization outlier detection, according to an embodiment.

In one embodiment, a quantization outlier detection is hence added as shown in FIG. 9, that is based on the diagram in FIG. 4. It shows how the points in point set $PC_1$ are further grouped into two subsets $PC_{11}$ and $PC_{12}$, based on a QT module (910). Points in $PC_{11}$ are inlier points that pass both model outlier test and quantization outlier test. Points in $PC_{12}$ are quantization outliers.

Figure 10:
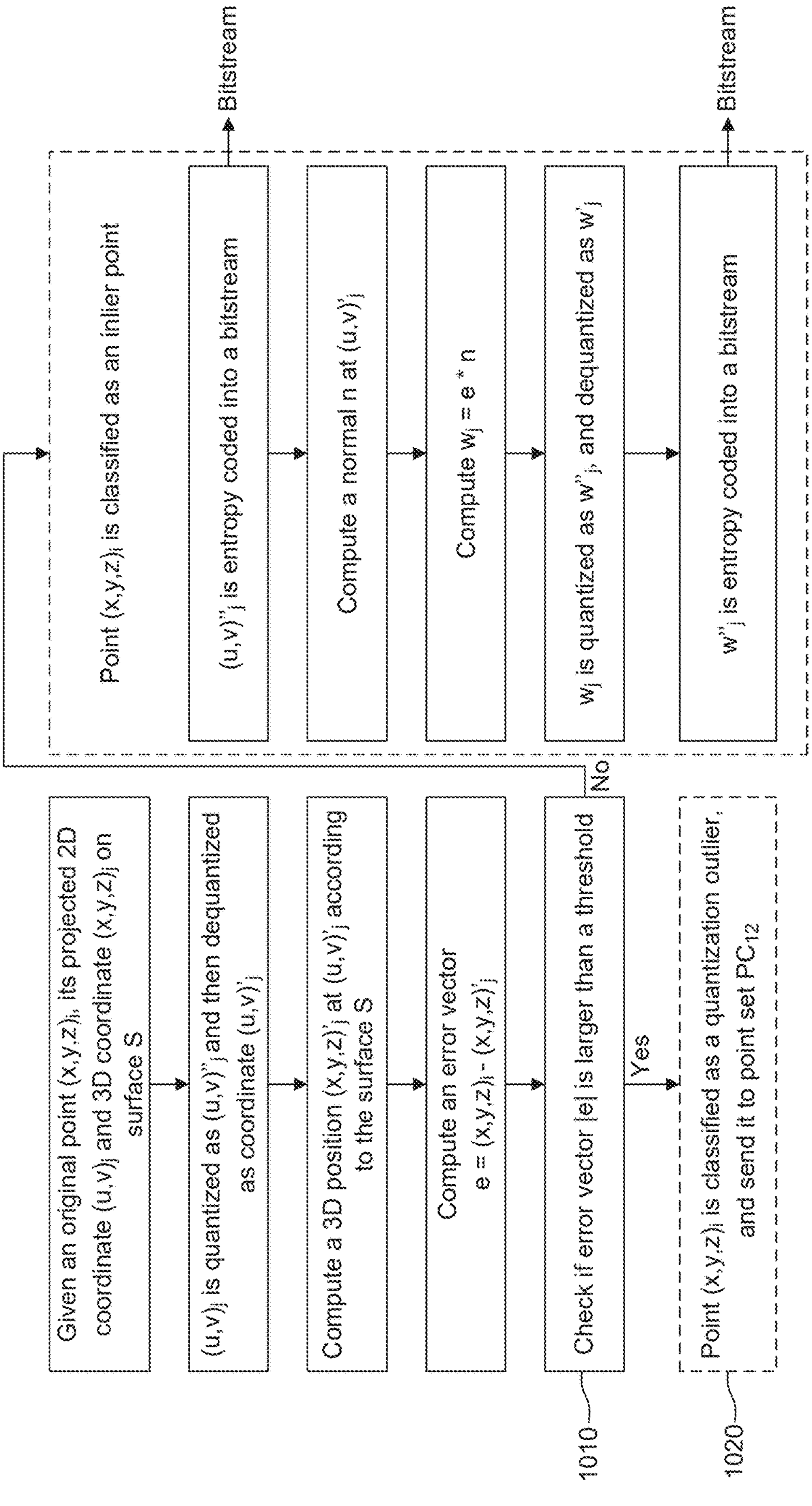
FIG. 10 illustrates a method of quantization outlier point detection and inlier point set compression, according to an embodiment.

According to an embodiment, FIG. 10 shows a block diagram to perform quantization outlier detection, that is a modified diagram based on FIG. 5. An additional step (1010) is included to detect whether the error vector e between the original position $(x, y, z)_i$ and its reconstructed position $(x, y, z)'_j$, $e=(x, y, z)_i-(x, y, z)'_j$, is larger than a threshold. This test is to determine (1010) whether the error is larger than a threshold, i.e., whether the point is sensitive to the quantization. If yes, point $(x, y, z)_i$ in input point cloud is classified (1020) as a quantization outlier point. Otherwise, it is coded as an inlier point as in FIG. 5.

In another implementation, the test for quantization outlier point detection can be performed by checking the error vector between the reconstructed positions before and after quantization: $e=(x, y, z)_j-(x, y, z)'_j$. If the error is large than a threshold, the corresponding original point $(x, y, z)_i$ is classified as a quantization outlier point. In yet another implementation, it is proposed to find a nearest neighboring point $P_m=(x, y, z)_m$ in input point cloud for point $P'_j=(x, y, z)'_j$, and the test is performed using the error $e=(x, y, z)_m-(x, y, z)'_j$.

The points in the quantization outlier set are coded using a separate coding method referenced as QC (920) in FIG. 9. In one embodiment, they can be coded using octree-based method. In another embodiment, they can be coded directly if there are a small number of points. Below we will describe a predictive coding approach in more detail.

In the end, the $Bitstream_0$ (for $PC_{11}$) output by FC, the $Bitstream_1$ (for $PC_{12}$) output by QC, and $Bitstream_2$ (for $PC_2$) output by FC, alongside the coding mode information, can be merged as one bitstream using the module M. The merged bitstream can then be sent to the decoder.

Predictive Coding for Outlier Points

In one embodiment, we propose a predictive coding approach for the outlier points provided that the inlier points are previously coded. In one embodiment, we use the same approach to code both model outlier points and quantization outlier points. Hence, we do not differentiate between the outlier point types in this embodiment.

Figure 11:
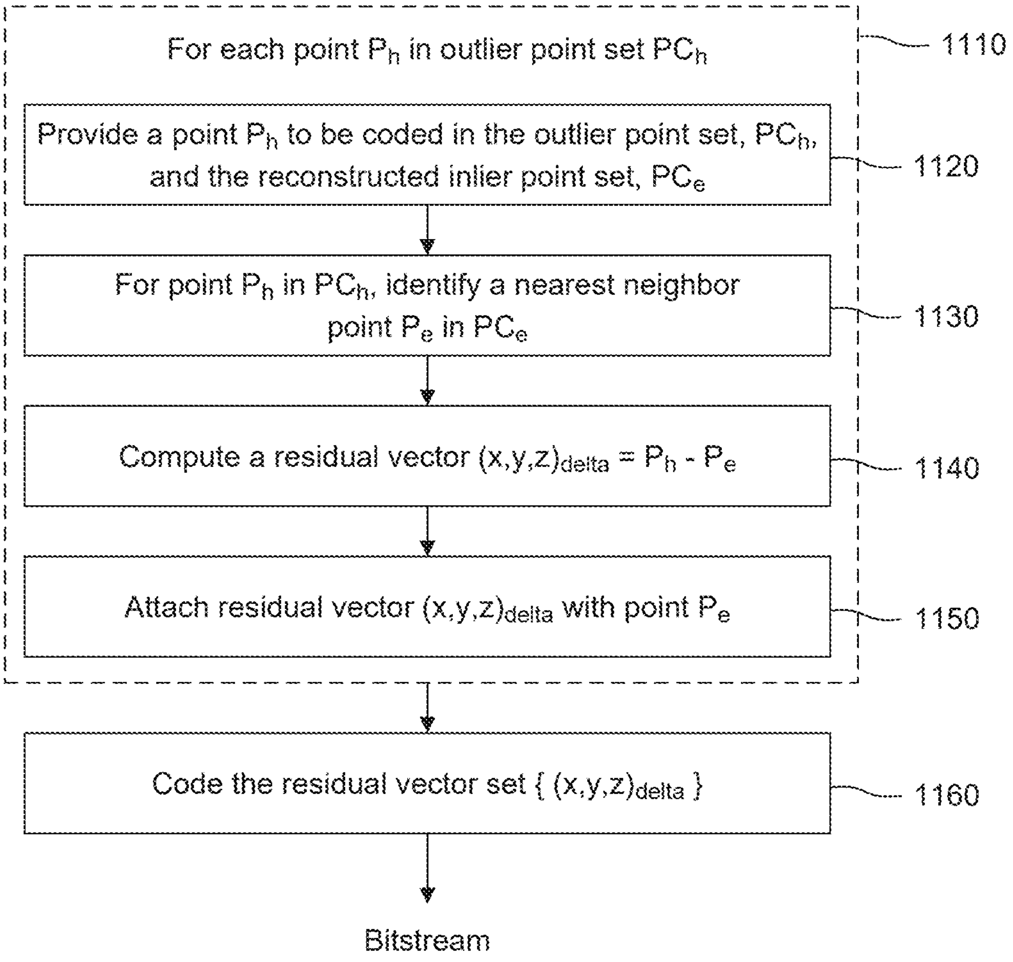
FIG. 11 illustrates a method of predictive coding of outlier point set, according to an embodiment.

To begin with, we first encode the inlier points and generate a bitstream $Bitstream_0$. Then for efficient coding of outlier point set, we propose to use the previously coded inlier points as predictors. For each point $P_h$ in the outlier point set $PC_h$, a residual $(x, y, z)_{delta}$ is computed (1110) as shown in FIG. 11. A nearest neighbor point $P_e$ from the coded inlier point set $PC_e$ is identified (1120, 1130) for a current outlier point $P_h$. Note that all points in $PC_e$ are previously coded. Then a residual vector is computed (1140) as $(x, y, z)_{delta}=P_h-P_e$.

Finally, we attach (1150) the residual vector with the identified inlier point $P_e$. In one embodiment, the residual vector is signaled using a data structure as shown in FIG. 12. Each inlier point is associated with a flag or integer number. This integer number indicates whether or how many residual vectors are associated. Last, the residual data structure for each inlier point are coded (1160) into bitstream, $Bitstream_1$, in the same order how the inlier points are coded.

Decoder Design

In the following, we present the decoder design. The decoder first parses the coding mode from the received bitstream. Based on the parsed coding mode, the decoder operates differently, as described in the following example variants.

Direct Decoding

Figure 13:
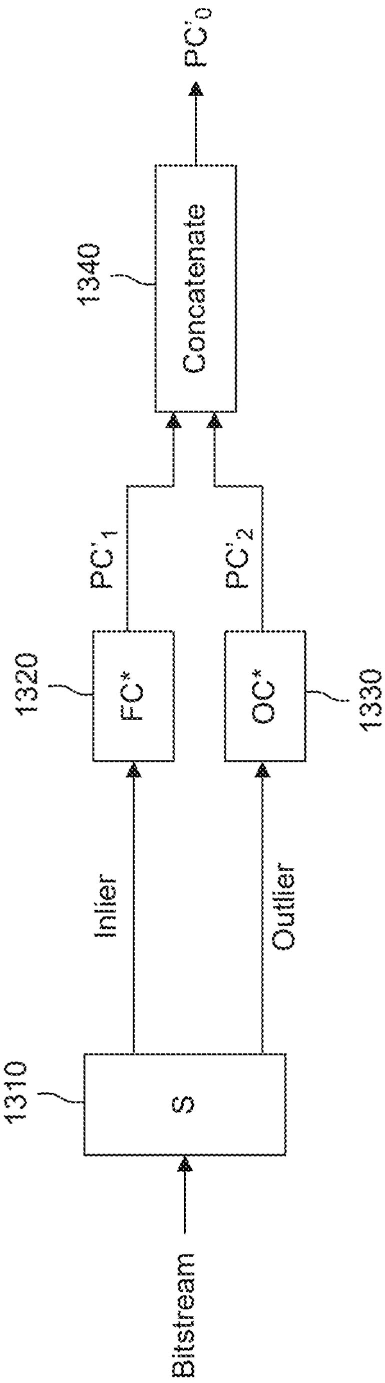
FIG. 13 illustrates a direct decoder with model outlier, according to an embodiment.

We begin with the first case, where two bitstreams, one for the inlier points ($Bitstream_0$) and another for the model outlier points ($Bitstream_1$), are encoded independently, for example, as illustrated in FIG. 4. Having received the bitstreams, a decoder as shown in FIG. 13, is applied for decoding. The decoder first parses the side information (SI) to demultiplex the input bitstream input two sections, $Bitstream_0$ and $Bitstream_1$, each corresponding to inlier points and outlier points, respectively. This is accomplished by the module S (1310). The two bitstreams are then decoded using decoder modules FC* (1320) and OC* (1330), respectively. Then, by concatenating (1340) the decoded point clouds $PC'_1$ and $PC'_2$, a final decoder output $PC'_0$ is obtained.

Figure 14:
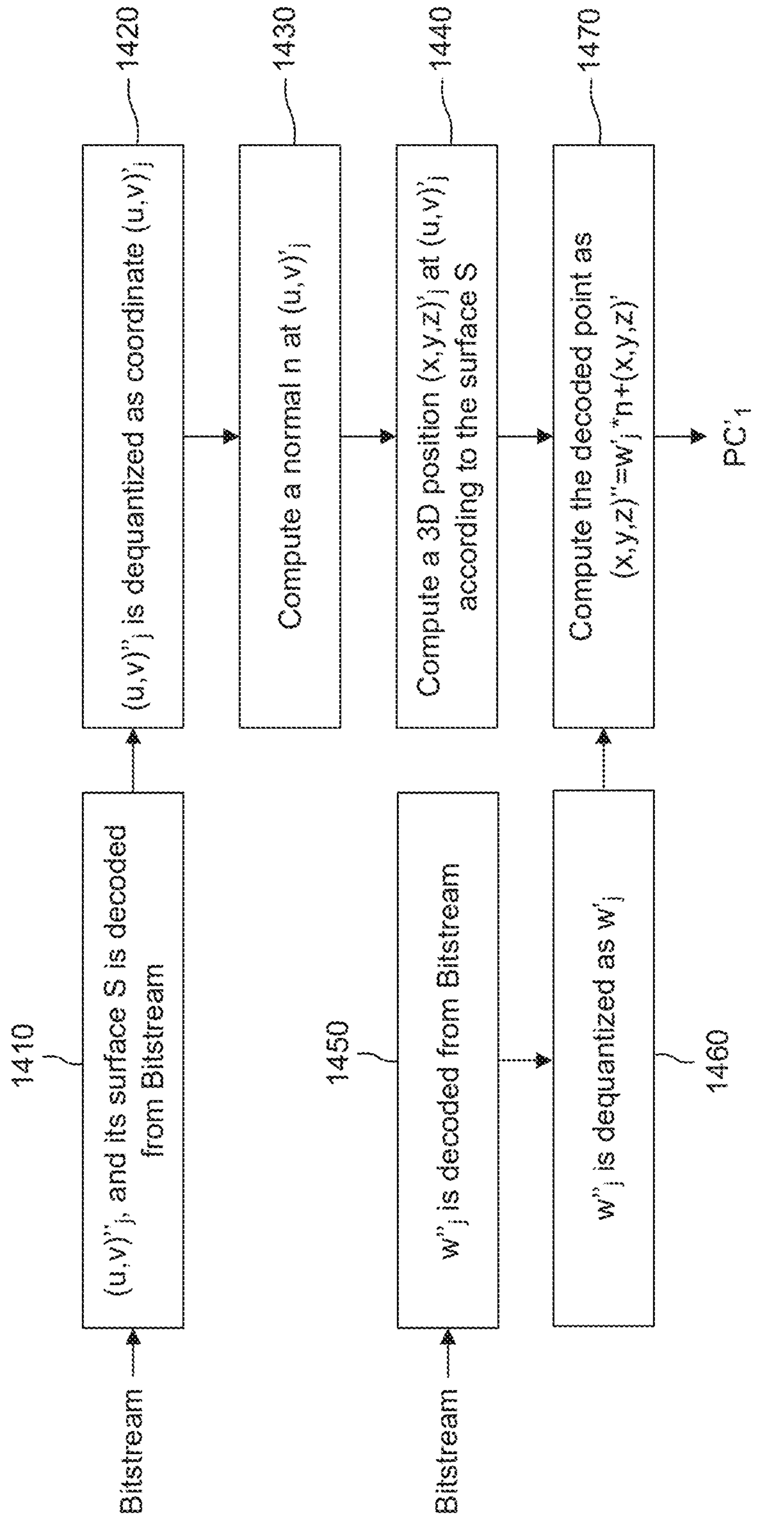
FIG. 14 illustrates decoding of inlier points, according to an embodiment.

In one embodiment as illustrated in FIG. 14, where FC* is a decoder associated to the encoder of FIG. 5, the $(u, v)''_j$ coordinate is firstly decoded (1410) and dequantized (1420) as $(u, v)'_j$. Then its corresponding 3D coordinate $(x, y, z)'_j$, and its normal n, are computed (1430, 1440). By decoding (1450) the $w''_j$ component and dequantizing (1460) it as $w'_j$, the decoded coordinate is given (1470) by $(x, y, z)''=w'_j*n+(x, y, z)'$. In another embodiment, FC* consists of a series of deconvolution layers to progressively upsample and decode $PC'_1$.

The design of decoder OC* is associated with its encoder counterpart OC as illustrated in FIG. 4. In one embodiment, it can be an octree decoder; in another embodiment, the model outlier coordinates are directly decoded from Bitstream if the outliers are directly encoded with OC.

Figure 15:
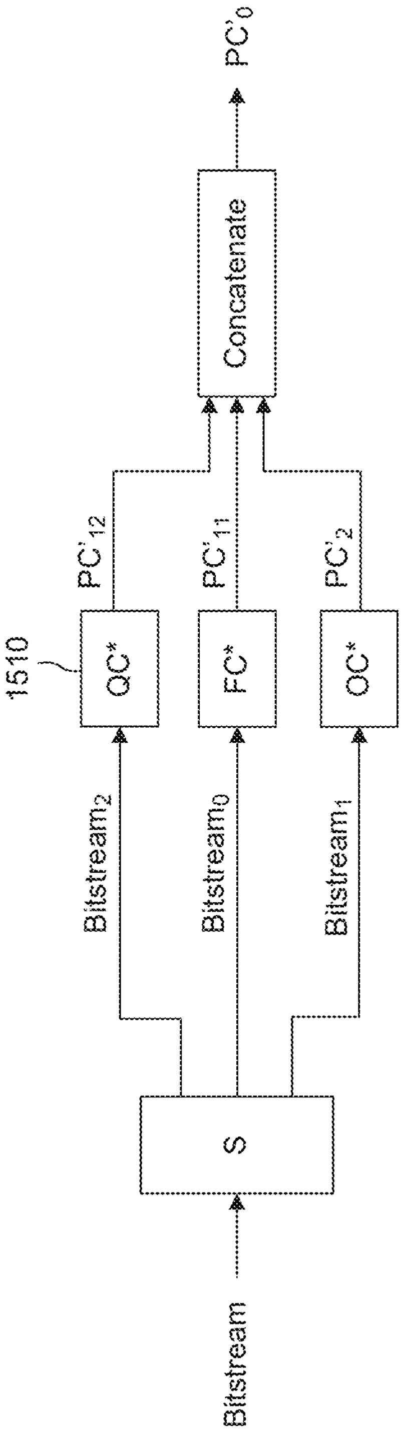
FIG. 15 illustrates a direct decoder with both types of outlier points, according to an embodiment.

When both the model outliers and the quantization outliers are detected and encoded in the encoder as illustrated in FIG. 9, another decoder design is adopted as shown in FIG. 15. Compared to FIG. 13, the module QC* (1510) is additionally incorporated to decode $Bitstream_2$ and outputs the quantization outliers. In one embodiment, QC* can be an octree decoder; in another embodiment, the quantization outlier coordinates are directly decoded from $Bitstream_2$ if the outliers are directly encoded with QC.

Sequential Decoding

Figure 16:
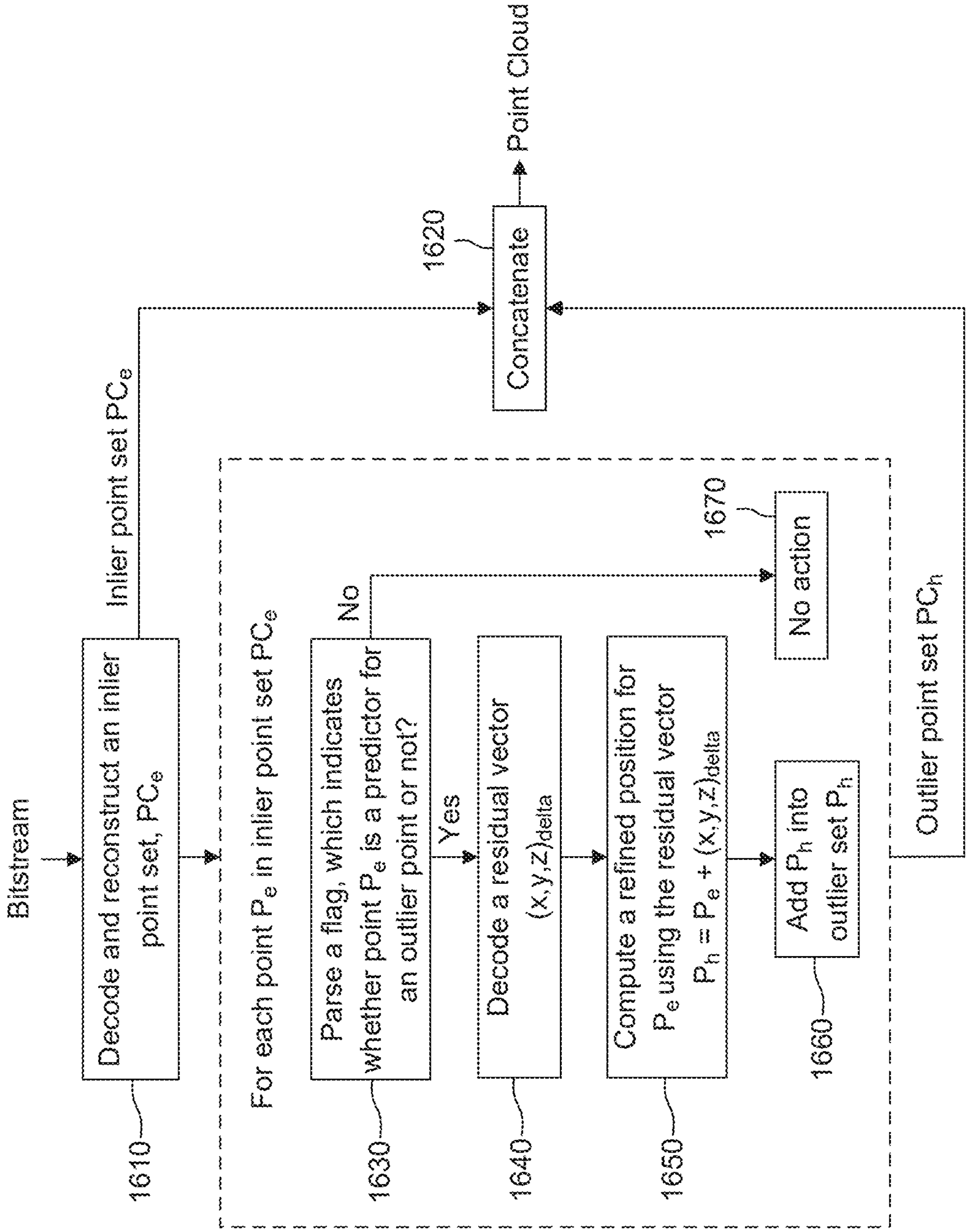
FIG. 16 illustrates a method of predictive decoding of outlier points, according to an embodiment.

Another design of decoder is associated with the predictive coding for outlier points. In one embodiment, we use the same coding approach to code both model outlier points and quantization outlier points, and we do not differentiate between the outlier point types in this embodiment. The proposed sequential decoding scheme is shown in FIG. 16.

In this embodiment, we first decode (1610) the inlier points from $Bitstream_0$. The inlier points are served for the predictors of the outlier points. At step 1630, a flag is parsed to indicate whether point Pe is a predictor for an outlier point or not. If not, no action is taken (1670). Otherwise, if Point Pe is a predictor, then the residual vectors associated with Pe are decoded (1640) from $Bitstream_1$. By adding (1650) the residual vectors to the corresponding inlier points, the outlier points are decoded (1660). In the end, the inlier points and the outlier points are concatenated (1620), which gives the decoded point cloud $PC'_0$.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of decoding point cloud data, comprising:
obtaining a first set of data from said point cloud data;
decoding said first set of data by a first type of learning-based method, wherein said first type of learning-based method corresponds to a point-based method or a convolution-based method;
obtaining a second set of data, representative of remaining part of said point cloud data;
decoding said second set of data, wherein said second set of data is predictively decoded based on said first set of data; and
concatenating said first and second sets of data.

2. The method of claim 1, wherein a coding mode indicates said first or second set of data.

3. A method of encoding point cloud data, comprising:
obtaining a first set of data of a point cloud from said point cloud;
encoding said first set of data by a first type of learning-based method, wherein said first type of learning-based method corresponds to a point-based method or a convolution-based method;
obtaining a second set of data of said point cloud, representative of remaining part of said point cloud; and
encoding said second set of data, wherein said second set of data is predictively encoded based on said first set of data.

4. The method of claim 3, wherein a coding mode indicates said first or second set of data.

5. The method of claim 3, wherein a flag indicates whether a sample in said first set of data is used for predicting a sample in said second set of data.

6. An apparatus for decoding point cloud data, comprising one or more processors and at least one memory coupled to said one or more processors, wherein said one or more processors are configured to:
obtain a first set of data from said point cloud data;
decode said first set of data by a first type of learning-based method, wherein said first type of learning-based method corresponds to a point-based method or a convolution-based method;
obtain a second set of data, representative of remaining part of said point cloud data;
decode said second set of data, wherein said second set of data is predictively decoded based on said first set of data; and
concatenate said first and second sets of data.

7. The apparatus of claim 6, wherein a coding mode indicates said first or second set of data.

8. An apparatus for encoding point cloud data, comprising one or more processors and at least one memory coupled to said one or more processors, wherein said one or more processors are configured to:

obtain a first set of data of a point cloud from said point cloud;

encode said first set of data by a first type of learning-based method, wherein said first type of learning-based method corresponds to a point-based method or a convolution-based method;

obtain a second set of data of said point cloud, representative of remaining part of said point cloud; and encode said second set of data, wherein said second set of data is predictively encoded based on said first set of data.

9. The apparatus of claim 8, wherein a coding mode indicates said first or second set of data.

10. The method of claim 8, wherein a flag indicates whether a sample in said first set of data is used for predicting a sample in said second set of data.

11. The method of claim 1, wherein said first type of learning-based method is a folding-based method.

12. The method of claim 11, wherein said decoding said first set of data comprises:

decoding a codeword representing a surface;

decoding a two-dimensional (2D) coordinate representative of a point on said surface; and computing a three-dimensional (3D) position of a point in said first set of data based on said decoded 2D coordinate and said surface.

13. The method of claim 3, wherein said first type of learning-based method is a folding-based method.

14. The method of claim 13, wherein said encoding said first set of data comprises:

encoding at least a portion of said point cloud data into a codeword representing a surface;

projecting a three-dimensional (3D) point of said first set of data onto said surface to obtain a two-dimensional (2D) coordinate; and encoding said 2D coordinate.

15. The apparatus of claim 6, wherein said first type of learning-based method is a folding-based method.

16. The apparatus of claim 15, wherein said one or more processors are configured to decode said first set of data by:

decoding a codeword representing a surface;

decoding a two-dimensional (2D) coordinate representative of a point on said surface; and computing a three-dimensional (3D) position of a point in said first set of data based on said decoded 2D coordinate and said surface.

17. The apparatus of claim 8, wherein said first type of learning-based method is a folding-based method.

18. The apparatus of claim 17, wherein said one or more processors are configured to encode said first set of data by:

encoding at least a portion of said point cloud data into a codeword representing a surface;

projecting a three-dimensional (3D) point of said first set of data onto said surface to obtain a two-dimensional (2D) coordinate; and encoding said 2D coordinate.

* * * * *